United States Patent
Steinkamp et al.

[11] 3,758,183
[45] Sept. 11, 1973

[54] FOOD MIXER STORAGE RACK

[75] Inventors: Norman A. Steinkamp, Chicago Heights; John M. Stipanuk, Elmhurst, both of Ill.

[73] Assignee: Sunbeam Corporation, Chicago, Ill.

[22] Filed: Aug. 26, 1971

[21] Appl. No.: 175,154

[52] U.S. Cl. .................... 312/292, 312/245, 259/1
[51] Int. Cl. ..................... A47b 81/00, A47b 67/02
[58] Field of Search ............... 259/1, 131; 312/236, 312/245, 204, 292; 16/152

[56] References Cited
UNITED STATES PATENTS

| | | | |
|---|---|---|---|
| 721,738 | 3/1903 | Peay | 16/152 |
| 747,062 | 12/1903 | Gill | 312/324 |
| 1,052,591 | 2/1913 | Kaiser | 312/324 |
| 1,927,398 | 9/1933 | Glasser | 49/70 X |
| 2,525,975 | 10/1950 | Thomas et al. | 16/152 |
| 3,341,026 | 9/1967 | Spitler | 312/138 |
| 1,869,542 | 8/1932 | Chamberlain | 16/152 |
| 1,984,977 | 12/1934 | Mize | 312/292 X |
| 3,030,166 | 4/1962 | Richards et al. | 312/292 X |
| 3,064,951 | 11/1962 | Fillweber | 312/245 |
| 3,357,682 | 12/1967 | Martens et al. | 259/1 R |

*Primary Examiner*—Paul R. Gilliam
*Attorney*—George R. Clark

[57] ABSTRACT

A storage rack for an electric food mixer wherein the mixer is nested in a hingable door of a compartment in which the beaters and cord for the mixer are stored with the cord supported on the inside of the door and the beaters mounted on the compartment wall on either side of the mixer. The rack is adapted for either wall mounting or table surface support and includes simplified means for detachably retaining the mixer on the rack. The door to the storage compartment is hinged so that the weight of the mixer tends to retain the door in the closed position.

8 Claims, 7 Drawing Figures

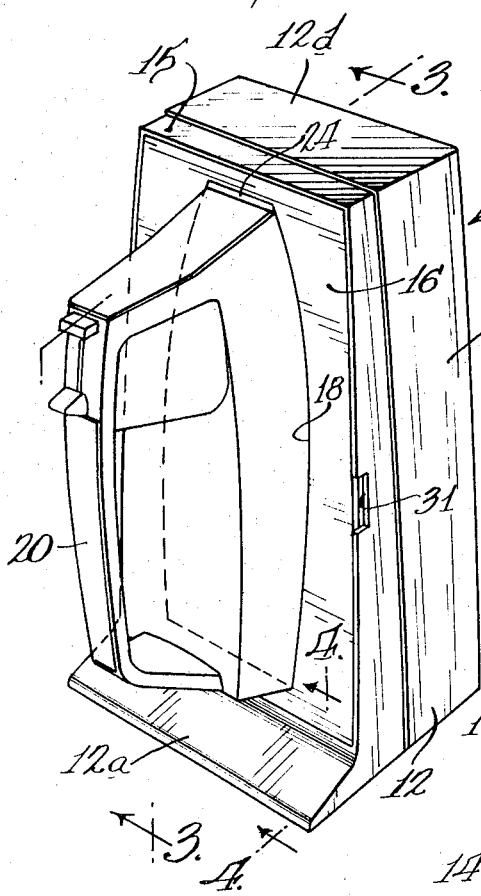
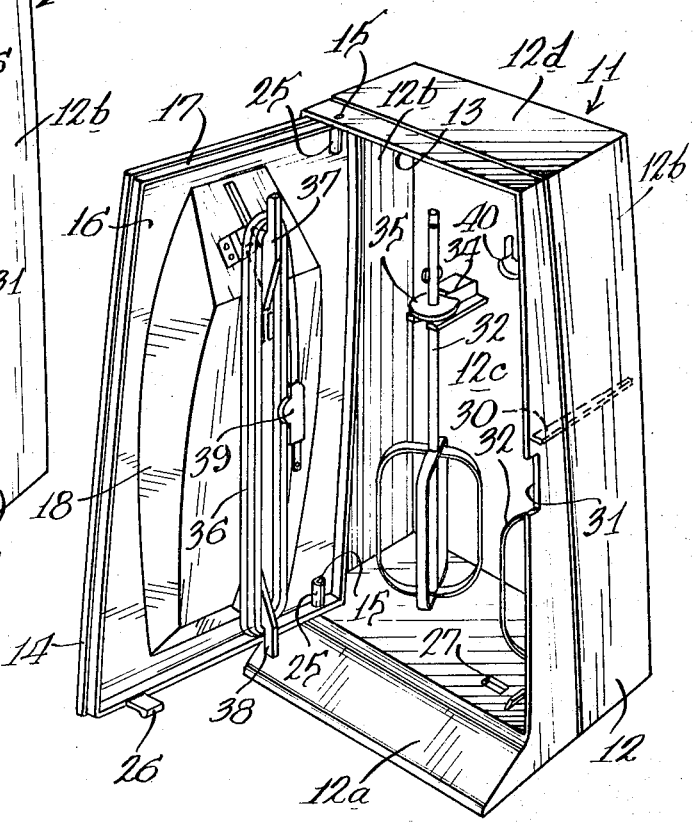

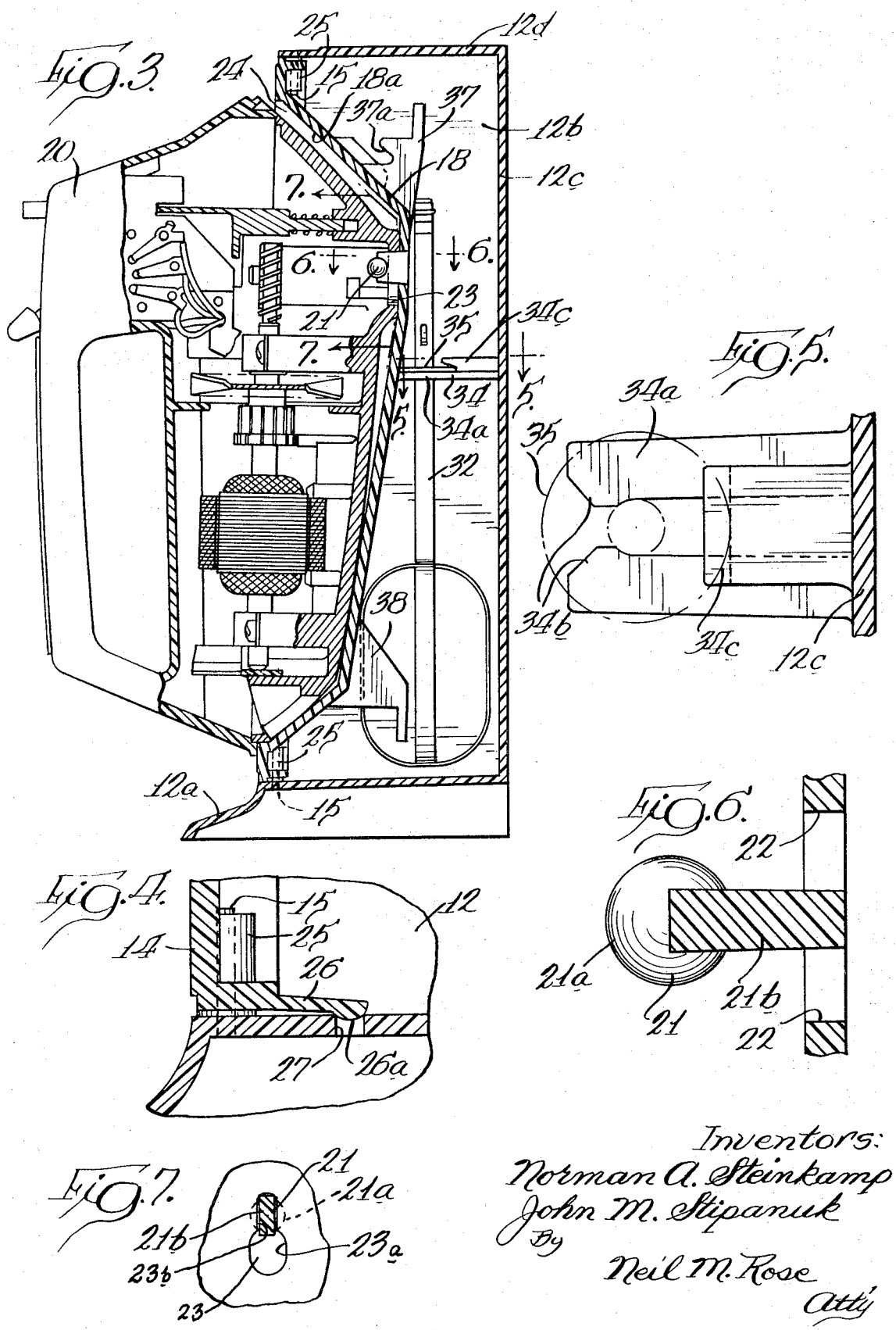

FOOD MIXER STORAGE RACK

BACKGROUND OF THE INVENTION

As the number and variety of appliances available to and used by a housewife in the kitchen has increased substantially in recent years, the problems of conveniently storing these appliances has become acute. Obviously much of the advantage and time saving convenience of an appliance is lost if the appliance must be stored in a location to which it is difficult and time consuming to gain access. This is particularly true of the appliances which are used more frequently and for shorter lengths of time such as an electric portable or hand mixer. In many instances if the hand mixer is not readily available, the housewife will merely perform the mixing chore with a manually operated mixer, a fork or other stirring implement. Accordingly, there have been many attempts in the past to provide convenient racks or stands for storing electrically operated hand held food mixers.

The patent to Butsch U.S. Pat. No. 3,482,893 is noted as one example of a hand mixer storage stand. While the Butsch patent is extremely simple in design and inexpensive to manufacture, it is adapted only for wall mounting and provides inconvenient means for storing the mixer, beaters and power cord. In addition, the moutning stand of the Butsch patent is unattractive and functional looking, and, therefore, unappealing to the modern housewife who is very style conscious with respect to the accessories mounted in exposed areas of the kitchen.

Another prior hand mixer stand is disclosed in Martens et al. U.S. Pat. No. 3,357,682. While the stand of the Martens et al. patent is attractive from a styling standpoint, it is bulky and complicated from a structural standpoint. It is noted that the overall width of the Martens et al storage rack is almost twice that of that disclosed in the Butsch patent. Because of the space limitations in the average kitchen, it is very important that any mixer storage rack or stand be constructed to occupy a minimum amount of wall space. In addition, the Martens et al storage rack is similar to the Butsch patent in that it is designed for wall mounting and would not be suitable for surface mounting as on the kitchen counter top.

SUMMARY OF THE INVENTION

The present invention is directed to a compact upright storage rack for an electrical hand mixer. The rack is adapted to be either wall mounted or supported on a horizontal surface. The rack consists of an upright storage compartment within which the mixer beaters are to be mounted. The storage compartment is closed by a hingably mounted member which includes a pocket or recess within which the base portion of a hand mixer is nested for storage purposes. The hingable member includes projections on the rear wall on which the mixer power cord may be wrapped for storage. The hinge for the member is angled with respect to the vertical axis so that the weight of the member and the mixer stored thereon tends to rotate the member to a position closing the front opening in the upright storage rack. To obtain the best utilization of space, the beaters are stored in a position where they straddle the cord storage space. In addition, the beaters are stored in an upright position with their lower ends straddling and adjacent to the bottom of the pocket within which the mixer is received. The result is a compact storage compartment which is of a minimal cross sectional area in the horizontal plane and substantially equal to the length of the mixer in the vertical direction and which stores the mixer, beaters and cord in such a way that there is little or no interference and so that these elements may be stored and removed from storage with a minimum of time and effort expended.

Accordingly, it is an object of the present invention to provide an improved storage rack for an electrically operated hand mixer.

A further object of the present invention is to provide a compact storage rack for a hand mixer, a cord and beaters, which rack includes a storage compartment closed by a hingably supported member which nests the hand mixer thereon for storage purposes on one side and with means to wind the cord for storage on the other side.

It is another object of the present invention to provide an improved mixer storage stand which is suitable for wall or counter mounting and which occupies a minimum amount of counter or wall space.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWING

FIG. 1 is a perspective view of a mixer storage stand embodying my invention and showing an electrical hand mixer thereon;

FIG. 2 is a perspective view of the mixer storage rack of FIG. 1, but with the mixer supporting member pivoted to its open position to expose the beaters and cord stored therein;

FIG. 3 is a vertical sectional view taken substantially on line 3—3 of FIG. 1.

FIG. 4 is an enlarged fragmentary sectional view taken on line 4—4 of FIG. 1;

FIG. 5 is an enlarged fragmentary sectional view taken on line 5—5 of FIG. 3;

FIG. 6 is an enlarged fragmentary sectional view taken on line 6—6 of FIG. 3; and FIG. 7 is an enlarged fragmentary sectional view taken on line 7—7 of FIG. 3.

DESCRIPTION OF THE PREFERRED EMBODIMENT

Referring to the drawings there is shown a hand mixer storage rack or stand which is designated generally by the reference numeral 11. The rack 11 consists of an upright housing 12 which includes a forwardly facing opening 13. Within the forwardly facing opening 13 there is mounted a member 14 which is pivotally supported by pins 15 and which serves as a closure for the opening 13 when in the position shown in FIG. 1. The member 14 is formed with a generally vertically extending flat or plane portion 16 surrounded by an inwardly extending flange 17 and provided with a centrally located pocket 18 within which a hand mixer 20 may be received as is best shown in FIG. 3. The pocket or recess 18 is formed to be complementary to the shape of the base portion of the hand mixer 20. Thus, when the hand mixer 20 is received within the pocket 18, the handle and the upper portion of the hand mixer 20 are exposed above the portion 16 of the member 14.

For the purpose of retaining the hand mixer 20 in the nested position shown in FIG. 3, there is provided at the bottom of the pocket 18 a retaining lug 21 which is shown in enlarged form in FIG. 6 and is also shown in FIG. 3. The lug 21 consists of an outer spherical portion 21a and a mounting shank 21b which interconnects with the base of the pocket 18 adjacent the retaining lug 21. There are a pair of openings 22 which permit the member 14 with the retaining lug 21 to be readily molded without the need of any movable cores. The hand mixer 20 is provided with the usual inverted keyhole type of mounting aperture 23, which is adapted to receive the spherical end 21a of the retaining lug 21. As is characteristic of such keyhole openings, there is an enlarged entrance portion 23a and a narrow retaining portion 23b. Since this type of mounting requires that the mixer be moved inwardly over the lug and then downwardly to engage the spherical portion 21a behind the narrowed portion of the keyhole mounting opening 23, the pocket 18 is provided with a clearance space 24 between the end of the mixer 20 and slanted end wall 18a of pocket 18 as shown in FIG. 3. This space 24 is necessary so that the mixer may be engaged with the member 14 at the upper edge of the pocket 18 at wall 18a and the retaining lug 21 may insert into the entrance portion 23a of the mounting opening 23 in the mixer. As soon as the lug has entered the opening 23 and the lower base of the mixer has seated on the recess bottom the mixer is slid downwardly thus engaging the spherical portion 21a behind the narrow portion of the mounting opening 23 thus restraining the mixer 20 against removal outwardly from the pocket 18. In order to remove the mixer 20, it is therefore necessary to move the mixer upwardly until the front of the mixer strikes the angled upper end wall 18a of the pocket 18 before moving it outwardly to disengage it from the lug 21. The slanted wall 18a of the pocket 18 serves as a kind of camming surface to control the movement of the mixer 20 as it is engaged with or disengaged from the retaining lug 21.

As was explained above, the member 14 is mounted for pivotal movement with respect to the housing 12 on pins 15 which extend outwardly from the upper and lower corners of the member 14. As is shown in FIG. 2 the inner wall of the memer 14 is formed with ribs 25 within which the pins 15 are press fitted. The outwardly extending ends of the pins 15 are simply received in holes formed in the portion of the housing 12 defining the forwardly facing opening 13.

As is shown in FIG. 3, the pins 15 are positioned coaxially but their axis is angled rearwardly slightly at the top. The purpose of this orientation of the axis about which the member 14 pivots is to achieve a condition in which the weight of the mixer 20 tends to bias the member 14 to the closed position as shown in FIG. 1. With the weight of the mixer directed downwardly at a point offset from the axis of the pins 15 and with the above described inclination of the axis, the weight of the mixer tends to maintain the member 14 in its closed position.

To provide a more positive latch and prevent any possible vibration between the housing 12 and the member 14, there is provided an integrally molded latch member 26 on the lower edge of the member 14. The latch member 26 has a portion 26a which engages an opening 27 in the housing 12. The housing 12 and the member 14 are both formed of resilient plastic and the latch member 26 flexes readily to disengage from opening 27 and permit opening of the member 14 to the position shown in FIG. 2.

The upright housing 12 is formed with a forwardly projecting base 12a with vertically extending side walls 12b, a rear wall 12c and a top wall 12d. The walls 12b, 12c and 12d form a compartment which is generally rectangular when viewed from the front, but narrows slightly toward the top because of the slight inward slope of the side walls 12b. On the side wall 12b, away from the pivot pins 15, there is formed a door stop rib 30 and a cut out 31 which facilitates grasping the edge of the member 14 to pivot it from the closed position. The door stop rib 30 merely serves to locate the limit of pivotal movement of member 14 as it moves to its closed position with respect to housing 12.

For the purpose of supporting a pair of beater members 32 within the housing 12, there are formed on the rear wall 12c of housing 12 beater support projections 34. These projections 34 consist of a bifurcated horizontal support or shelves 34a which is best shown in FIGS. 3 and 5. The support of shelf 34a is designed to resiliently clip the shaft of the beater 32 between spaced arms 34b as best shown in FIG. 5. The beaters 32 are formed with circular mounting washers 35 affixed to their shaft portions. When the beaters 32 are in the storage position with respect to housing 12, the washers 35 rest on the horizontal supports 34a. The inherent resilience of the plastic permits the beaters to be inserted and removed from between the nibs or retaining fingers 34b which retain the beaters 32 within the housing 12. In order to assure that the beaters 32 are not loosely supported within the housing 12 such that they might rattle against the side walls, each of the beater support projections 34 is formed with an upper overhanging lip or camming surface 34c which overlies the washer 35 and tends to prevent any pivotal or oscillatory movement of the beater 32 in its position held by the nibs 34b. As is evident from FIG. 3 the front face of each of the overhanging lips 34c is angled to facilitate insertion of the beater 32 with its washer 35 into its assembled position with respect to the beater projection 34.

It should be noted that in their assembled position with respect to the housing 12 the beaters 32 are in an upright position with the mixing elements positioned in the open bottom corners of the storage spaced formed by the housing 12. In this position angled contour of the lower edge of the pocket 18 is in its closed position, positioned closely adjacent these mixing portions of the beater 32 as is evident from FIG. 3 of the drawings.

One of the most troublesome elements of a hand mixer from a storage standpoint is the elongated power cord. For the purpose of storing a power cord 36, the member 14 is formed with rearwardly extending cord mounting hooks 37 and 38 extending from the bottom of the pocket 18. The hooks 37 and 38 are centrally positioned so that in the closed position of the member 14 they are located and extend between the beaters 32. The lower cord mounting hook 38 has a horizontally extending portion around which the cord 36 is looped and has a downwardly extending portion which retains the wound loops thereon. The upper hook 37 has a secondary recess 37a within which the plug on the end of the cord adapted for insertion into the mixer may be hooked prior to commencing the looping of the cord around the hooks 37 and 38. Otherwise the hook 37 is similar to the hook 38 having the horizontal portion for receiving the loops of cord and an upwardly extending projection which prevents the looped cord from being disengaged therefrom.

The cord 36 is provided at its outer end with a plug 39 having integrally formed therewith a clip portion which permits the plug to be secured to an adjacent length of cord to retain the coiled cord in the desired position. Since this type of plug is quite common, it has not been disclosed in detail. In order to assemble the cord 36 to the member 14 for storage purposes, it is necessary only to open the member 14 to the position shown in FIG. 2, hook the inner end of the cord in the recess 37a and continue looping the cord around the mounting hooks 37 and 38 and upon completion of this looping the plug 39 is merely clipped to an adjacent length of cord to prevent the cord from unwinding from the hooks 37 and 38. When the member 14 is located in its closed position as shown in FIGS. 1 and 3, the looped cord 36 and hooks 37 and 38 are positioned in a compact manner between the beaters 32, thus providing the most efficient use of the space within the housing 12.

It should be appreciated that the member 14 opens approximately 145° from its closed position to its open position thus providing ample access for easy insertion and removal for the beaters 32 from their support projections 34. In addition, in the open position of the member 14, the job of wrapping the cord on the hooks 37 and 38 is facilitated because of the substantial space between the hooks 37 and 38 and housing 12. In the closed position of the member 14, the beaters and cord are completely hidden from view and the mixer 20 is attractively nested within the pocket 18. The mounting opening 23 on the mixer is easily engaged with and detached from the retaining lug 21 by virtue of the guiding action provided by the sloping side wall 18a of the pocket 18, thus providing structurally simple and easy to manufacture storage device which consists only of two molded plastic parts together with the mounting pins for the member 14. The forwardly projecting piece 12a permits the stand 11 to be either supported on a counter top or alternatively a keyhole opening 40 in the rear wall 12 c provides simple means for mounting the stand 11 on the wall. Thus the stand 11 is both flexible as far as the manner of use is concerned and is extremely compact. It takes up little more space than the three elements stored therein, i.e. the mixer, the beaters and cord.

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. A mixer storage stand comprising a housing having a top wall, bottom wall, rear wall and a pair of side walls, said housing having one open side, a mounting member pivotally supported on said housing for movement between a first position in which it forms a closure for said open side and a second position in which access is provided to the interior of said housing, said mounting member being formed with an outwardly facing recess which is shaped to receive the lower base portion of said mixer, retaining means for said mixer positioned in the bottom of said recess and extending outwardly thereof for engagement with a mounting opening in said mixer, said mixer being movable vertically with respect to said retaining means to secure said mixer against detachment from said retaining means and removal from said recess, said recess being formed with an angled surface to facilitate the removal and attachment of said mixer with respect to said retaining means, said housing including beater storage means for beaters of the type having a shaft supporting a beating element at one end and a mounting projection intermediate the ends, said beater storage means comprising a pair of bifurcated horizontal shelves extending into said housing from said housing rear wall, a slot in each said bifurcated horizontal shelf for supporting said projection on said shaft, a camming surface above each said shelf to secure one of said beaters to said shelf when said beater is placed into said slot in said shelf, each of said slots being defined in part by a pair of retaining fingers on said shelf to removably secure said shaft in said slot.

2. The mixer storage stand of claim 1 wherein said mounting member is provided with a cord storage means including a pair of oppositely disposed fingers extending into said housing from the rear of said recess bottom, each of said fingers having a hook-shaped contour to provide spaced supports around which a mixer power cord may be wound, an inwardly extending slot on one of said fingers to receive one end of a power cord such that the retention and winding of said cord are easily accomplished.

3. The mixer storage stand of claim 2 wherein said cord storage means is located on the outside center portion of said recess and one said beater storage means is located adjacent the intersection of said one side wall and said rear wall and another said beater storage means is located adjacent said other side wall and said rear wall such that said cord storage means and said recess nest in the space between the beaters to form a compact package for storing the mixer, beaters and cord in a minimum of space when said mounting member is in a closed position.

4. The mixer storage stand of claim 1 including hinge means for pivotally supporting an edge of said mounting member, the axis of said hinge extending generally vertically but being inclined rearwardly so that said mounting member is biased towards an open position providing access to the interior of said housing or a closed position in which said mounting member forms a closure for said open side of said housing.

5. The mixer storage stand of claim 4 wherein said hinge comprises a pair of hinge pins, a pair of holes in said top and bottom walls of said housing, a pair of hinge pin ribs on said mounting members provided with holes to receive said hinge pins, said pins being pressed through said housing holes and into said mounting member such that said holes in said top and bottom walls of said housing and said holes in said mounting member ribs locate said pins upon a common axis having a tilt toward the rear upper wall of said housing so as to bias said mounting member to either an open or closed position with respect to said housing.

6. A mixer storage stand for mounting a mixer of the type having a mounting opening in the base thereof which opening has an enlarged entrance portion and a narrow retaining portion forwardly from the entrance portion, comprising a housing having a top wall, bottom wall, rear wall and a pair of side walls, said housing having one open side, a mounting member pivotally supported on said housing for movement between a first position in which it forms a closure for said open side and a second position in which access is provided to the interior of said housing, said mounting member being formed with an outwarldy facing recess which is shaped to receive the lower base portion of said mixer, retaining means for said mixer positioned in the bottom of said recess and extending outwardly thereof for engagement with said mounting opening in said mixer, said retaining means including a lug mounted to the bottom of said recess such that said lug extends outwardly from said recess, said lug comprising an outer enlarged portion suitable for insertion into said entrance portion of said mounting opening, said enlarged portion being supported by a mounting which is connected to said recess bottom, said mounting shank being snugly receivable in said retaining portion, said mixer being movable vertically with respect to said retaining means to secure said mixer against detachment from said retaining means and removal from said recess, said recess being formed with an angled surface spaced from one wall of said mixer to facilitate the removal and attachment of said mixer with respect to said retaining means, said lug being positioned so as to engage the entrance portion of said mixer mounting opening when said mixer is inserted into said recess for storage and as said mixer is moved downwardly in said recess, said shank moves into said retaining portion of said mounting opening wherein said enlarged portion restrains said mixer from movement outwardly of said recess.

7. The mixer storage stand of claim 6 wherein said angled surface guides said mixer onto said retaining means, said angled surface including an upper wall of said recess, said upper recess wall angularly connecting the front wall of said mounting member and said recess bottom, said upper recess wall being spaced a greater distance from where said shank portion of said lug is connected to said bottom than the distance of said mounting opening on said mixer is spaced from the leading wall of said mixer lower base portion such that said mixer may be inserted into said recess by pressing said mixer against said upper wall of said recess so that said leading wall of said mixer slides inwardly and downwardly against said angular upper recess wall and the guiding of said upper recess wall moves said mixer to a position where said spherical portion of said lug engages the entrance portion of said mounting opening.

8. The mixer storage stand of claim 6 wherein the lower end of said housing has a base below said open side projecting forwardly for supporting said housing in an upright position, a pair of beaters for said mixer supported on the inside of said housing on a wall opposite said open side and positioned such that said beaters are compactly located between said wall and rearward projection of said mounting member recess and the inside corner formed by said wall and the other vertical walls of said housing, said back of said recess bottom having a cord supporting means centered thereon such that said cord supporting means is located between said beaters when said mounting member is closed.

* * * * *